(No Model.)
M. S. NELMS.
SAW SWAGING MACHINE.
No. 464,382. Patented Dec. 1, 1891.
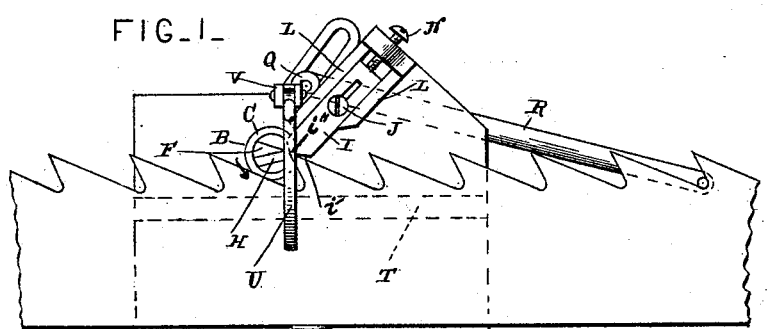
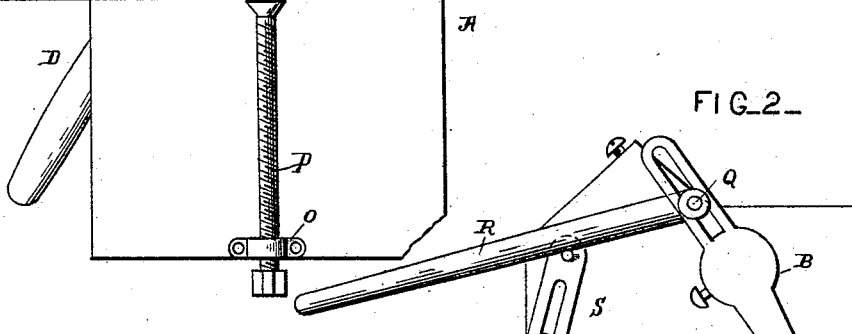
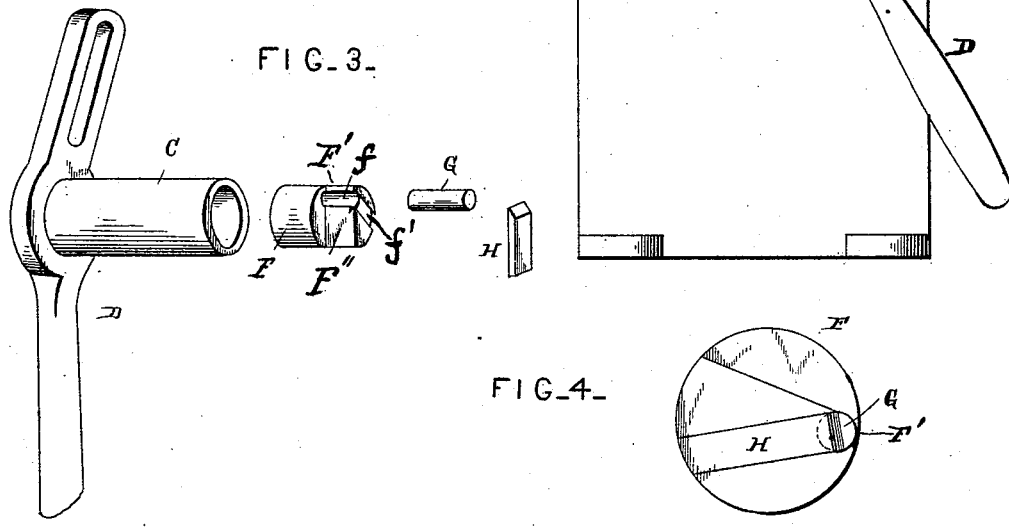
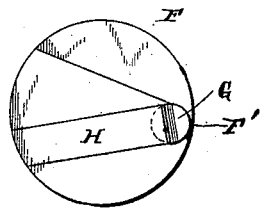
Witnesses.
Geo. E. Frech.
J. M. Nesbit.
Inventor.
Markus S. Nelms
per
Lehmann & Pattison,
Attys.

UNITED STATES PATENT OFFICE.

MARKUS SYLVESTER NELMS, OF SOUTH PITTSBURG, TENNESSEE.

SAW-SWAGING MACHINE.

SPECIFICATION forming part of Letters Patent No. 464,382, dated December 1, 1891.

Application filed March 23, 1891. Serial No. 386,101. (No model.)

*To all whom it may concern:*

Be it known that I, MARKUS SYLVESTER NELMS, of South Pittsburg, in the county of Marion and State of Tennessee, have invented certain new and useful Improvements in Band and Circular Saw Swages; and I do hereby declare the following to be a full, clear, and exact description of the invention, such as will enable others skilled in the art to which it pertains to make and use it, reference being had to the accompanying drawings, which form part of this specification.

My invention relates to an improvement in band and circular saw swages.

My invention consists in certain novel features of construction and in combination of parts more fully described hereinafter, and more particularly pointed out in the claims.

Figures 1 and 2 are side elevations of a saw-swage which embody my invention, taken from opposite sides. Fig. 3 is an enlarged detached view of the operating-shaft, the die, and its attachments. Fig. 4 is an edge view of the swage.

A represents a frame-work of any suitable shape or construction that may be preferred, which is provided with a bearing B upon its rear side for the shaft C, which is secured rigidly to the operating-lever D. The shaft C is just long enough to extend through the bearing B and frame A, and may be made hollow its entire length or only have a recess in its front end to receive the die F. This die may be given any suitable shape at its inner end, and which has its outer end preferably shaped as shown. In a suitable recess in this die is placed a small steel roller G, which serves to spread the teeth of a saw, and which is held in place in the die by a dovetailed slide H. This roller G is made removable, so that it can be turned in the die and replaced whenever it becomes necessary. When the shaft C is made to partially revolve by the operating-lever D, this roller G is made to bear against the point of the saw-tooth that is bearing against the end of the anvil I, and thus spread it. This anvil I, preferably, has its inner end shaped as shown, and is provided with a slot through which passes a screw J, which holds the anvil in position between the guides L on the frame A, and which anvil is adjusted back and forth in relation to the saw-teeth by the set-screw N, which passes through a suitable bearing, which is provided for the purpose. By making the anvil adjustable it is adapted to operate in connection with saws having different lengths and shapes of teeth.

If a band or straight saw is to be swaged, it is supported upon the frame by means of a grooved screw P and support O. The grooved end of the screw is applied to the back edge of the saw below the swaging device. The shorter end of the lever D is made slotted, as shown, and in this slot is placed the adjustable bearing Q, upon which the feed-rod R is secured. By making this bearing adjustable in the slot a longer or shorter stroke may be imparted to the feed-rod and to the pawl, according to the space of the teeth of the saw being swaged. In order to hold this feed-rod in a proper position, a slotted support S is secured to one side of the frame by means of a set-screw, and projecting from the upper end of the support is a rod or arm upon which the feed-arm rests. The slot and the set-screw enable the slotted support S to be adjusted into any desired position.

When a circular saw is to be swaged, the support O and screw P are removed, and the frame is then fastened upon a bench having a mandrel to hold the saw. In order to prevent the saw from bearing directly against the side of the frame, there is secured a strip T to the front face of the frame, and against this strip the saw is made to bear while being swaged. To prevent the saw from springing or having any movement while its teeth are being swaged, a lever U is pivoted in a suitable bearing V, secured to or formed upon the top of the frame A, and this lever is provided with a suitable number of bearing-points, which press the saw inward and hold it rigidly in place. While the saw is being held by the lever U, the lever D is operated, and the roller G is made to gradually spread the teeth until the roller touches the anvil, and as this roller rolls downward the die F rolls upward, cutting away all surplus metal by the action of the roller and die on the edge $i''$ of the anvil and making every tooth the same length from the back of the saw. By this construction a smooth and straight flange is swaged upon every tooth, thus requiring very little side filing. The hard-metal die F is recessed on one side of its outer portion to form the transverse face F'', forming the longitudinal edge or shoulder F' at one end of said face. Near and parallel with said edge F' said face of the roller is provided with a roller-recess $f$, opening through the end of the die into an undercut or dovetailed way $f'$, which receives the slide H. By this arrangement the cylindrical roller in said recess $f$ projects above the face F'' close to and parallel with edge F'. The adjustable anvil I has the incline transverse face $i'$, against which the upper edge of the tooth bears, and this face $i'$ terminates in an edge $i''$ at the point of the tooth. In operation, as the die rotates in the direction of the arrow the roller G at one side of the axis of the die moves up along the under edge of the tooth-point, swaging the same against anvil-surface $i'$, and as the roller leaves the flattened point the edge F' of the die coacts with edge $i''$ of the anvil to cut the tooth-point off squarely, so that they are of the same length and to form a good cutting-edge. Great strength and durability and extreme simplicity and cheapness are attained by employing the peculiar arrangement of die F, by having the roller-recess and way $f'$ and the slide for retaining the roller, which is superior in many ways to screw-threaded devices.

I do not herein claim the combination of an adjustable anvil having a single flat face without cutting-edge, with a swaging-roller to coact therewith to flatten the teeth out, and extending through and secured by screws in a rotary block which does not engage the tooth during operation.

Having thus described my invention, I claim—

1. In a saw-swage, the combination of a support, the adjustable anvil having the swaging-face terminating in an edge, the rotary die having the cut-away portion forming the flat transverse face, and the cutting-edge at one side parallel with the axis of rotation, the recess in said die-face near and parallel with said cutting-edge, the swaging-roller located in said recess and projecting above the flat surface of said face, means for removably securing said roller, and operating means for the die, substantially as set forth.

2. The combination of the supporting-plate A, adjustable anvil I, the shaft, the die F, projecting from the shaft end opposite the anvil, and having the side recess forming a flat transverse face having longitudinal cutting-edge F', and recess $f$ near and parallel with said edge and extending to the outer end of said die, the swaging-roller in said recess $f$, the transverse dovetailed way in the outer end of the die opening into the outer end of said recess $f$, and the removable slide H in said way removably holding the roller in its recess, the parts being arranged and combined as set forth.

In testimony whereof I affix my signature in presence of two witnesses.

MARKUS SYLVESTER NELMS.

Witnesses:
J. H. WEAKLEY,
JNO. L. WORNACK.